(12) United States Patent
Lee et al.

(10) Patent No.: US 8,133,627 B2
(45) Date of Patent: Mar. 13, 2012

(54) FUEL CELL SYSTEM

(75) Inventors: Jong-Ki Lee, Suwon-si (KR); Yun-Suk Choi, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1593 days.

(21) Appl. No.: 11/109,938

(22) Filed: Apr. 20, 2005

(65) Prior Publication Data

US 2005/0238944 A1    Oct. 27, 2005

(30) Foreign Application Priority Data

Apr. 21, 2004   (KR) .................. 10-2004-0027412

(51) Int. Cl.
  *H01M 8/04*  (2006.01)
  *H01M 8/24*  (2006.01)

(52) U.S. Cl. ..................... 429/432; 429/454

(58) Field of Classification Search .............. None
See application file for complete search history.

(56) References Cited

U.S. PATENT DOCUMENTS

| | | | |
|---|---|---|---|
| 4,310,605 A | 1/1982 | Early et al. | |
| 6,497,974 B2 * | 12/2002 | Fuglevand | 429/432 |
| 6,781,343 B1 | 8/2004 | Demachi et al. | |
| 2005/0186454 A1 * | 8/2005 | Clingerman et al. | 429/13 |

FOREIGN PATENT DOCUMENTS

| | | |
|---|---|---|
| JP | 06338341 | 12/1994 |
| JP | 2000-223141 | 8/2000 |
| JP | 2000243420 | 9/2000 |
| JP | 2002-324562 | * 11/2002 |
| JP | 2002324562 | 11/2002 |
| JP | 2003-007322 | 1/2003 |
| JP | 2003178786 | 6/2003 |
| WO | 02/25761 | 3/2002 |

* cited by examiner

*Primary Examiner* — John S Maples
(74) *Attorney, Agent, or Firm* — H.C. Park & Associates, PLC

(57) ABSTRACT

A fuel cell system that includes a stack includes a plurality of generators for producing electrical energy by an electrochemical reaction of hydrogen and oxygen. The generators are connected in series. In addition, the fuel cell system comprises a fuel supply assembly for supplying fuel comprising hydrogen to the generators, an oxygen supply assembly for supplying oxygen to the generators and at least one branch member that is coupled to at least one of the generators.

9 Claims, 4 Drawing Sheets

FUEL CELL SYSTEM

CROSS REFERENCE TO RELATED APPLICATION

This application claims priority to and the benefit of Korean Patent Application No. 10-2004-0027412 filed on Apr. 21, 2004 in the Korean Intellectual Property Office, the entire content of which is incorporated herein by reference.

BACKGROUND OF THE INVENTION (a) Field of the Invention

The present invention relates to a fuel cell system. In particular, the present invention relates to a fuel cell system that has a structure that improves the electrical connection between the stack and a load.

(b) Description of the Related Art

A fuel cell is a system that produces electrical energy using chemical reaction energy between hydrogen contained in hydrocarbons such as methanol, and air containing oxygen.

Fuel cells are classified into various categories including phosphate fuel cell, molten carbonate fuel cell, solid oxide fuel cell, and polymer electrolyte or alkali fuel cell. Although each of these different types of fuel cells operates using the same principles, they differ in the type of fuel, catalyst, and electrolyte used, as well as in operating temperature.

A polymer electrolyte membrane fuel cell (PEMFC) has been developed recently. The PEMFC has excellent output characteristics, a low operating temperature, and fast starting and response characteristics compared to other fuel cells. In the PEMFC, hydrogen that is generated by converting methanol or ethanol may be used as a power source in a wide range of applications such as vehicles, homes, buildings, and electronic devices.

The basic components of the PEMFC are a stack, reformer, fuel tank, and fuel pump. The stack forms the main body of the fuel cell. The fuel pump supplies fuel from the fuel tank to the reformer. The reformer converts the fuel to produce hydrogen gas and supplies the hydrogen gas to the stack. The hydrogen gas reacts with oxygen in the stack to thereby generate electrical energy.

In the PEMFC system, the stack is structured to include numerous unit cells that comprises a membrane electrode assembly (MEA) and separators that are provided on both sides of the MEA. An anode and a cathode are provided opposite each other with an electrolyte layer interposed therebetween to form the MEA.

Further, the separator may comprise a bipolar plate that separates each of the MEAs. The separator also provides a pathway through which hydrogen and oxygen, which are required for fuel cell reaction, are supplied to the anode and cathode of the MEA. In addition, the separator couples the anode and cathode of each MEA in series.

Hydrogen is supplied to the anode and oxygen is supplied to the cathode via the separator. The hydrogen is oxidized in the anode, and the oxygen is reduced in the cathode. Electricity is generated by the flow of electrons that occurs during these reactions. Heat and moisture are also generated.

Each unit cell provides a voltage of about 0.5 to 0.7 V, and as a plurality of unit cells are stacked and are serially connected, the stack produces a voltage that is proportional to the total unit voltages of all the unit cells. The electricity is then separated according to the predetermined voltage required by a load. For example, the required voltages for circuit elements, CPUs or driver ICs of electronic devices such as laptops or mobile communication terminal devices, are separated through a separately installed DC-DC converter which allows the prescribed voltage to then be applied to each load.

A conventional fuel cell system needs space for the DC-DC converter to fit in the fuel cell system, which increases the size of the system and complicates the structure of the system. In addition, since parasitic power is additionally required for driving the DC-DC converter, the efficiency of the system is decreased.

SUMMARY OF THE INVENTION

The present invention provides a fuel cell system with a compact structure that can separate the voltage that is created from the stack into a predetermined voltage that is required by each load, and then directly apply the voltage to each load. Therefore, this system does not need a DC-DC converter unlike in conventional systems, which results in a simpler structure of the overall system and the control process. In addition, the present invention can enhance the efficiency of the system by not requiring the parasitic power that is needed to drive a DC-DC converter of the conventional system.

Additional features of the invention will be set forth in the description which follows, and in part will be apparent from the description, or may be learned by practice of the invention.

The present invention discloses a fuel cell system that comprises a stack that has a plurality of serially connected generators for creating electrical energy by an electrochemical reaction of hydrogen and oxygen. The fuel cell system further comprises a fuel supply assembly for supplying fuel containing hydrogen to the generators, an oxygen supply assembly for supplying oxygen to the generators, and at least one branch member that is coupled to at least one of the generators.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
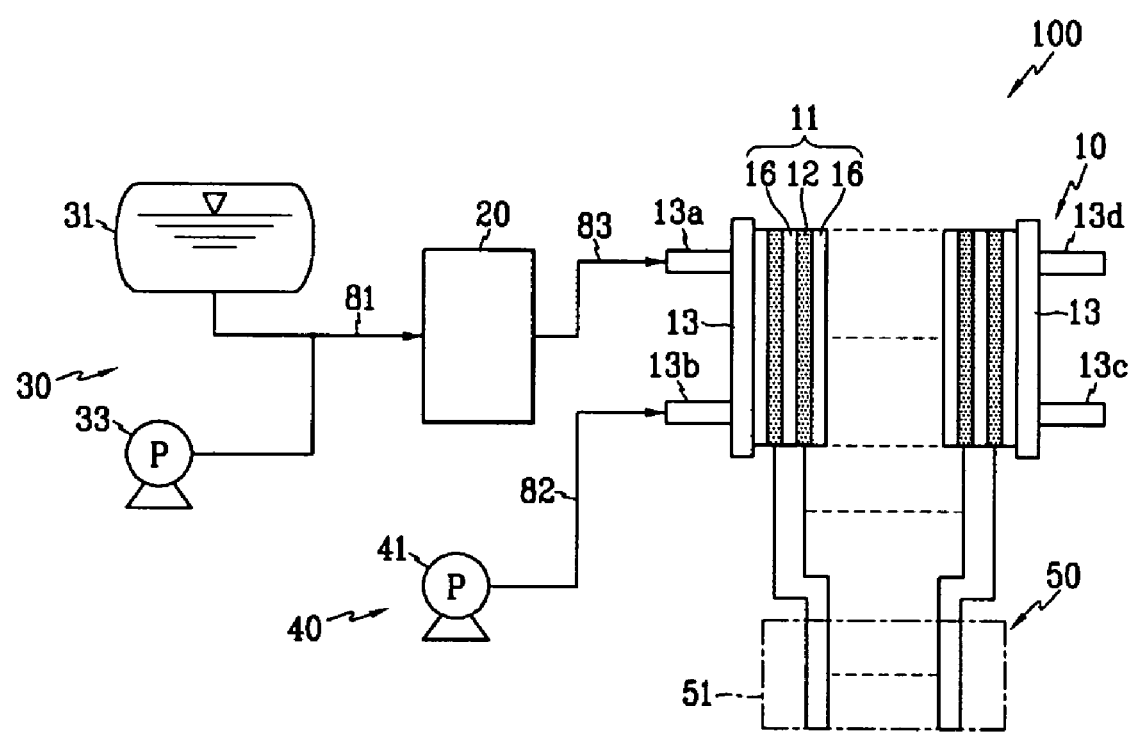
FIG. 1 is a schematic view of a fuel cell system according to an exemplary embodiment of the present invention.

FIG. 1 is a schematic view of a fuel cell system according to an exemplary embodiment of the present invention.

In the fuel cell system 100 shown in FIG. 1, a polymer electrolyte membrane fuel cell (PEMFC) configuration is used in which hydrogen is generated by converting fuel containing hydrogen, and electrical energy is generated by a reaction between the hydrogen and oxygen.

In the fuel cell system 100, the fuel comprises hydrogen and may include, but is not limited to methanol, ethanol, or natural gas. In addition, the oxidant that reacts with the hydrogen may be oxygen gas that is stored in a separate storage container, or it may simply be air containing oxygen. In the following description, it will be assumed that air containing oxygen is used.

The fuel cell system 100 of the present invention includes a reformer 20 that generates hydrogen by converting the fuel that contains hydrogen and a stack 10 that converts chemical reaction energy of the hydrogen and oxygen into electrical energy. In addition, the system 100 includes a fuel supply assembly 30 that supplies liquid fuel to the reformer 20, and an oxygen supply assembly 40 that supplies oxygen to the stack 10.

Alternatively, the fuel cell system 100 may utilize a direct oxidation fuel cell method, in which liquid fuel is directly supplied to the stack 10 to generate electricity. Unlike the PEMFC method, the direct oxidation fuel cell does not require a reformer 20, as shown in FIG. 1. While the present invention is not limited to this method, the following description of the fuel cell system 100 will utilize the PEMFC method.

The reformer 20 converts liquid fuel through a catalytic reaction using heat energy to generate hydrogen gas and also reduces the concentration of carbon monoxide contained in the hydrogen gas. The reformer catalytic reactions in the reformer may include, but are not limited to steam reformation or partial oxidation. Further, the reformer 20 uses a catalytic reaction such as water gas conversion, selective oxidation, or a method of refining hydrogen using a separating layer to reduce the concentration of carbon monoxide contained in the reformed gas.

The fuel supply assembly 30 includes a fuel tank 31 that stores liquid fuel and a fuel pump 33 that is connected to the fuel tank 31. The fuel tank 31 and the reformer 20 may be connected through a first supply line 81.

The oxygen supply assembly 40 may include an air pump 41 to take in air from the surroundings. The air pump 41 and the stack 10 may be connected through a second supply line 82.

Figure 2:
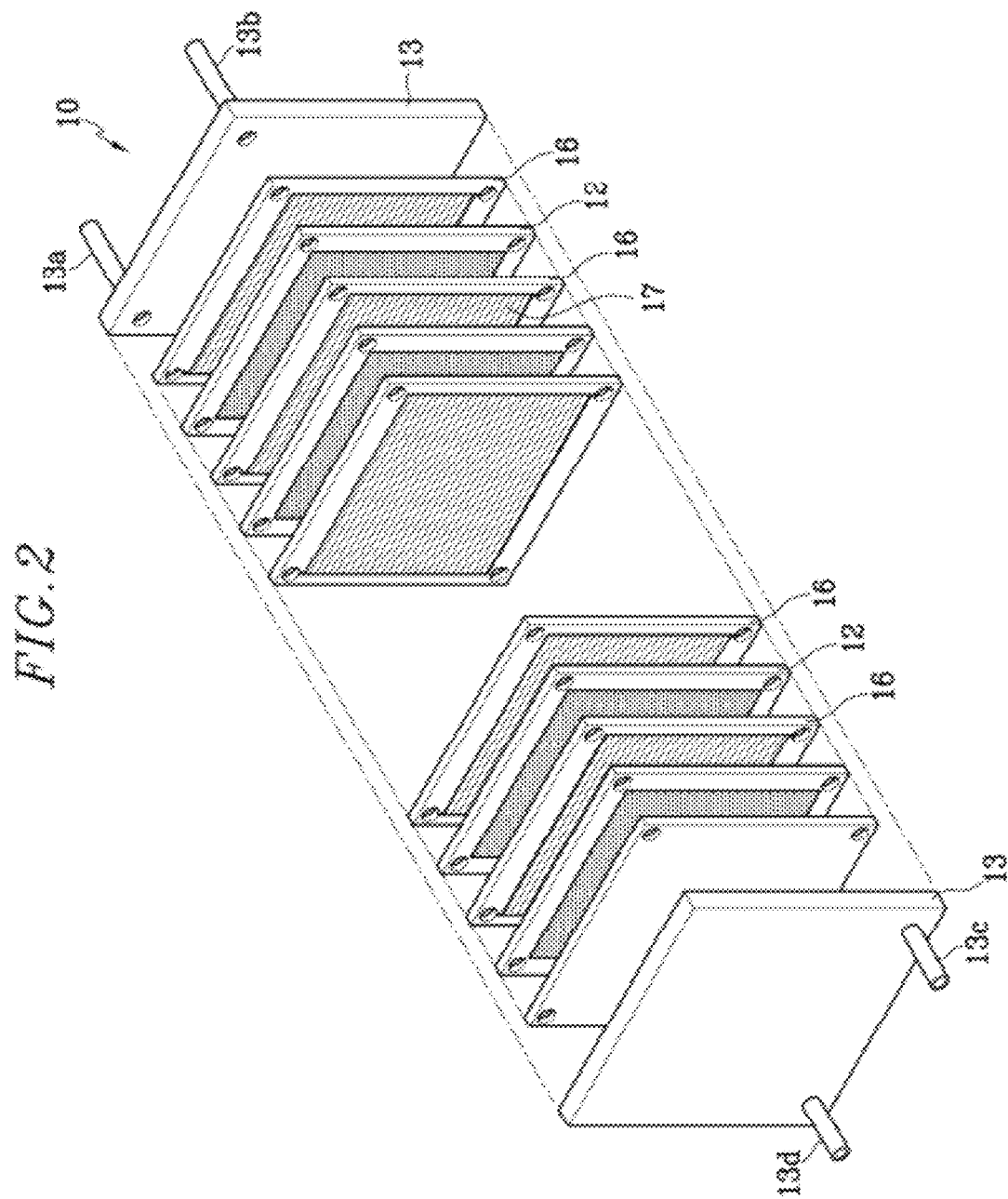
FIG. 2 is an exploded perspective view of a stack of FIG. 1.

FIG. 2 is an exploded perspective view of the stack shown in FIG. 1.

With reference to FIG. 1 and FIG. 2, the stack 10 of the fuel cell system 100 includes at least one generator 11. Each of the generators 11 forms a unit cell that generates electricity by interposing a membrane electrode assembly (MEA) 12 between two separators 16. A plurality of unit cells are stacked together to form the stack 10 of the present exemplary embodiment.

Pressing plates 13 can be mounted to the outermost layers of the stack 10 to compress the plurality of the generators 11 together. The pressing plates 13 may also function as the separators 16, which will be explained in the following description. However, the separators 16 that are positioned as the outermost layers of the generators 11 may be used instead of the pressing plates 13.

An anode and a cathode are mounted to opposite surfaces of each of the MEAs 12, and an electrolyte layer is positioned between the anode and the cathode.

The anode is supplied with reformed gas through the separator 16 and has a catalytic layer that separates the reformed gas into electrons and hydrogen ions. It also has a gas diffusion layer that facilitates the flow of the electrons and the reformed gas.

The cathode is supplied with air through the separator 18 and has a catalytic layer that generates water by reacting electrons from the anode, hydrogen ions, and oxygen contained in air. It also has a gas diffusion layer that facilitates the flow of the oxygen.

The electrolyte layer facilitates an ion-exchange which moves the hydrogen ions that are generated in the catalytic layer of the anode to the catalytic layer of the cathode.

Each of the separators 16 acts as a path through which hydrogen gas and air that are necessary for the oxidation/reduction reaction of the MEAs 12 are supplied to the anode and the cathode. Each of the separators 16 also functions as a conductor that connects the currents that are generated from each of the generators 11 in series. In particular, each of the separators 16 provides a flow channel 17 that forms a hydrogen path on a surface that closely contacts the anode of the corresponding MEA 12 to allow the supply of hydrogen gas to the anode. The separators 16 also include an air path on a surface that closely contacts the cathode of the corresponding MEA 12 to allow the supply of air to the cathode.

The pressing plates 13 include a first infusion member 13a for supplying hydrogen gas to the hydrogen path of the corresponding separator 16 and a second infusion member 13b for supplying air to the air path of the corresponding separator 16. In addition, the press plates include a first discharge member 13c for exhausting hydrogen gas remaining after reaction in the anode of the corresponding MEA 12 and a second discharge member 13d for exhausting air that remains after the reaction with hydrogen and the water that is generated by combining hydrogen and oxygen in the cathode of the corresponding MEA 12. The first infusion member 13a may be connected to the reformer 20 through a third supply line 83. The second infusion member 13b may be connected to the air pump 41 through a fourth supply line 82.

With reference to FIG. 1, each of the generators 11 of the fuel cell system 100 produces a unit voltage of about 0.5 to 0.7 V When a plurality of the generators are stacked and are serially connected, the stack 10 produces a voltage that is proportional to the product of the unit voltage and the number of stacked generators 11.

The fuel cell system 100 of this exemplary embodiment of the present invention can couple at least one generator 11 to each of the loads to directly apply the prescribed voltage to each load. In order to directly apply the prescribed voltages to each load, the fuel cell system 100 has at least one branch member 50 that can be coupled to at least one of the generators 11. This configuration is different from the conventional structure of fuel cell systems in which the total voltage generated in the stack 10 is divided and separated according to the predetermined voltage that is required by each of the loads using a DC-DC converter.

Figure 3:
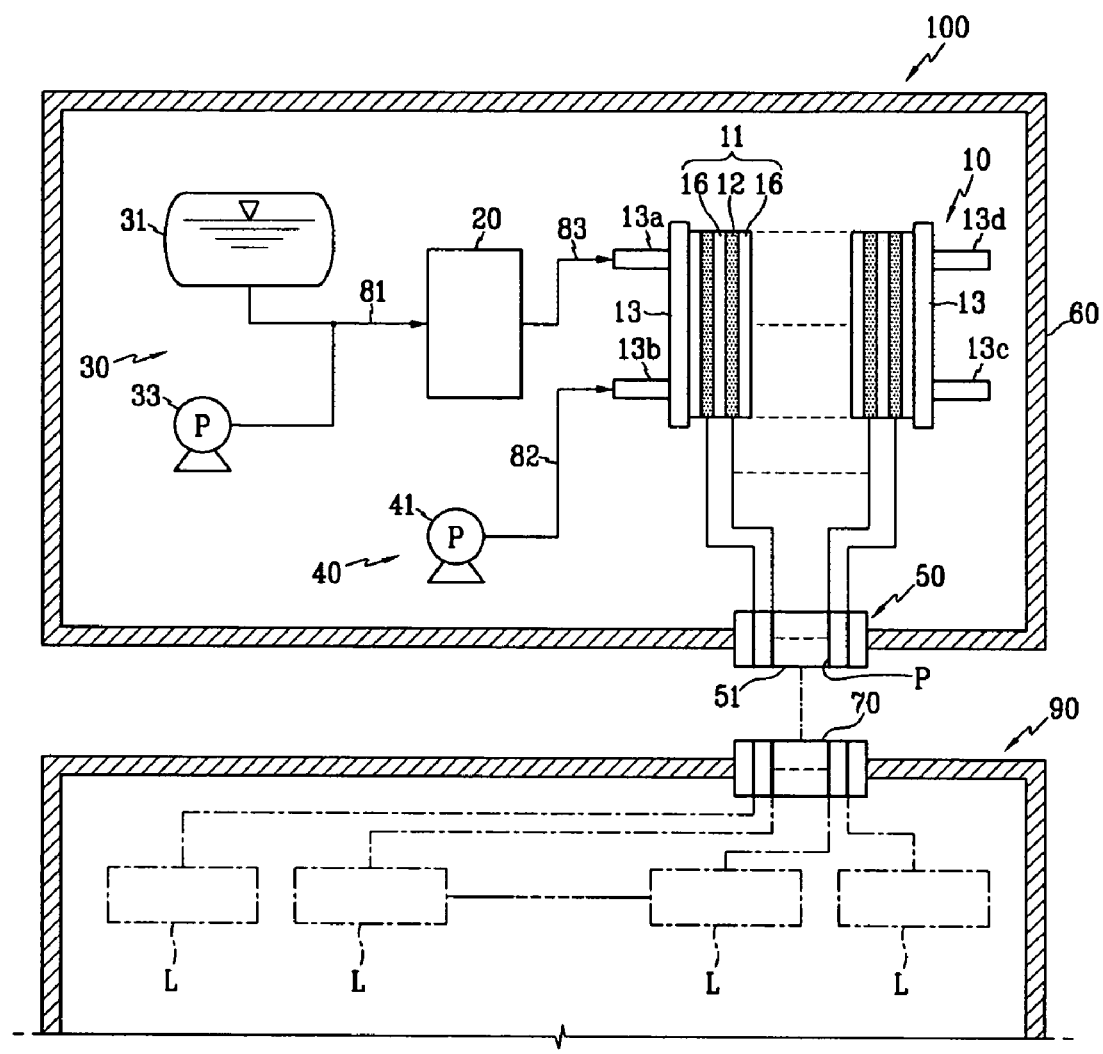
FIG. 3 is a schematic view of the assembly structure of the branch member of FIG. 1 and an electronic device using the fuel cell system of the present invention.
Figure 4:
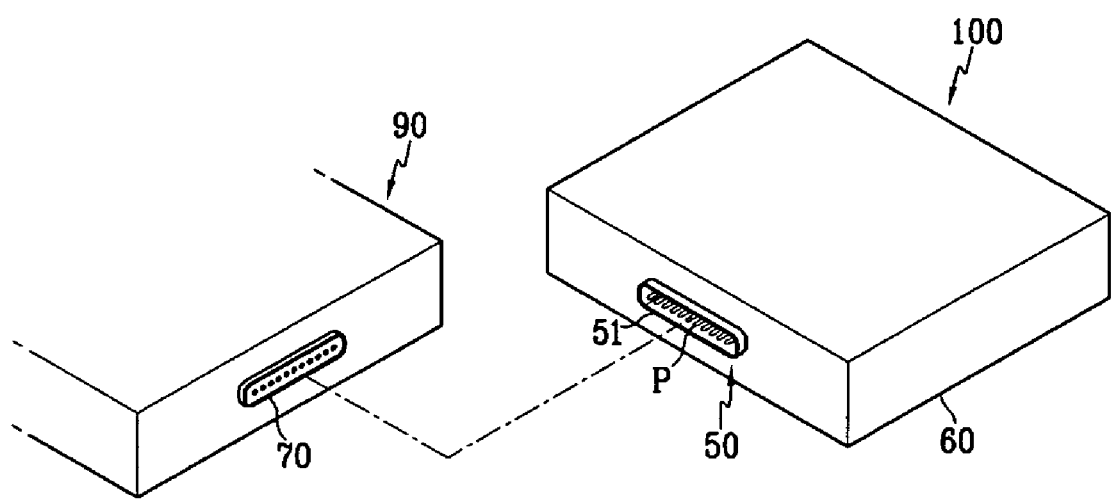
FIG. 4 is a schematic perspective view of the exterior of a fuel cell system according to an exemplary embodiment of the present invention.

FIG. 3 is a schematic view of the assembly structure of the branch member 50 of FIG. 1 and includes an electronic device 90 that uses the fuel cell system of the present invention. FIG. 4 is a schematic perspective view of the exterior of a fuel cell system according to an exemplary embodiment of the present invention.

With reference to FIG. 3 and FIG. 4, the branch member 50 according to an exemplary embodiment of the present invention has a connection terminal 51 that can separate the total voltage that is created from the plurality of generators 11 into the prescribed voltages of the plurality of loads (L) and directly apply the prescribed voltage to each of the loads (L). The above load (L) may include CPUs or driver ICs of electronic devices 90 for portable electronic devices such as laptops or mobile communication terminal devices, for example, or circuit elements for driving the electronic devices 90.

Preferably, the connection terminal 51 has a plurality of terminal pins (P) where each terminal pin (P) is coupled to at least one of the generators 11. In addition, the connection terminal 51 may allow each of the terminal pins (P) to be coupled to more than one of the generators 11 to apply a combined voltage created from more than one generator 11 to the load (L) that requires the corresponding voltage.

For example, when the terminal pins (P) of the connection terminal 51 have 1st, 2nd, 3rd ... nth terminal pins, the loads (L) have 1st, 2nd, 3rd ... nth loads, the voltage created from each of the generators 11 is 0.6 V, and the voltage required by the first load is 2.4 V, the first terminal pin of the connection terminal 51 is coupled to four generators 11 and the first terminal pin is connected to the first load. This allows the total voltage that is generated from the plurality of generators 11 to be separated into predetermined voltages to be applied to each of the 2nd, 3rd ... nth loads though the 2nd, $3^{rd}$ ... nth terminal pins.

The connection terminal 51 is mounted at an outlet outside a packaging member 60 that surrounds the entire fuel cell system 100. The connection terminal can be coupled to each load (L) by a male-female connection with a separate connector 70 that is mounted in an exterior housing of the electronic device 90.

The following description will detail the operation of a fuel cell system according to an exemplary embodiment of the present invention.

The packaging member 60 of the fuel cell system 100 of the present invention is mounted in the exterior housing of the portable electronic device 90. When the packaging member 60 is mounted in the exterior housing of the electronic device 90, the connection terminal 51 of the branch member 50 that protrudes from the package portion 60 is coupled with the connector 70 of the exterior housing of the electronic device 90. Accordingly, the connection terminal 51 of the fuel cell system 100 is coupled to the load (L) of the electronic device 90 through the connector 70.

While the fuel cell system 100 of the present invention is mounted in the electronic device 90, the fuel pump 33 is activated to supply the liquid fuel that is stored in the fuel tank 31 to the reformer 20 through the first supply line 81. Then, the reformer 20 generates hydrogen gas from the fuel through a steam reformation (SR) catalytic reaction, for example, using heat energy, and also reduces the concentration of carbon monoxide contained in the hydrogen gas through a water-gas shift (WGS) catalytic reaction, or a preferential CO oxidation (PROX) catalytic reaction.

Next, the hydrogen gas comprising a reduced carbon monoxide concentration is supplied to the first infusion member 13a of the stack 10 through the third supply line 83. Then, the hydrogen gas is supplied to the anode of the MEA 12 via the hydrogen path of the separator 16.

In addition, air is supplied to the second infusion member 13b of the stack 10 through the second supply line 82 by activating the air pump 41. Then, the air is supplied to the cathode of the MEA 12 via the air path of the separator 16.

Accordingly, the hydrogen gas is separated into electrons and protons (hydrogen ions) by an oxidation reaction at the anode. Further, the protons move to the cathode through the electrolyte layer. Since the electrons are unable to pass through the electrolyte layers, they move to the cathode of the adjacent MEAs 12 through the separators 16. The flow of the electrons to the cathode during this operation creates an electric current. In addition, water is generated at the cathode by reducing oxygen with the electrons and hydrogen ions.

The processes described above allows each of the generators 11 to produce electricity with a voltage of about 0.5 to 0.7 V. As a plurality of the generators 11 are stacked to be connected in series, the stack 10 produces electricity with a voltage that is proportional to the product of the unit voltage of each generator and the number of stacked generators 11.

Each of the terminal pins (P) of the connection terminal 51 is coupled to one or more of the generators 11 to produce the voltage that is required by each of the loads (L) of the electronic devices 90. Since the connection terminal 51 and each of the loads (L) of the electronic devices 90 are connected through the connector 70, the terminal pins (P) separate the total voltage that is created from the generators 11 into the voltage that is required by each of the plural loads (L) and apply the prescribed voltage to each of the loads (L).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fuel cell system, comprising:
   a stack comprising a plurality of generators that produce electrical energy by an electrochemical reaction between hydrogen and oxygen;
   a fuel supply assembly;
   an oxygen supply assembly;
   at least one branch member that is coupled to a plurality of the generators for simultaneously separating a total voltage that is produced by the plurality of generators into predetermined voltages and simultaneously applying the predetermined voltages to a plurality of loads, a packaging member that surrounds the entire fuel cell system and receives the at least one branch member; and
   an outlet of the at least one branch member exposed outside of the packaging member,
   wherein the generators are connected in series,
   wherein each load is to be connected by the at least one branch member to at least one different generator from any other load,
   wherein the at least one branch member comprises a connection terminal for separating the total voltage that is produced by the plurality of generators into the predetermined voltages and applying each of the predetermined voltages to at least one of the loads, and
   the connection terminal comprises a plurality of terminal pins that are each coupled to at least one of the generators.

2. The fuel cell system of claim 1, wherein the at least one branch member is coupled to a load though a connector.

3. The fuel cell system of claim 1, wherein the fuel supply assembly comprises a fuel tank that stores fuel, and a fuel pump that is connected to the fuel tank.

4. The fuel cell system of claim 1, wherein the oxygen supply assembly comprises an air pump.

5. The fuel cell system of claim 1, further comprising:
   a reformer that converts the fuel that is supplied by the fuel supply assembly into hydrogen gas.

6. The fuel cell system of claim 1, wherein the fuel cell system uses a polymer electrolyte membrane fuel cell scheme.

7. The fuel cell system of claim 1, wherein the fuel cell system uses a direct oxidation fuel cell scheme.

8. The fuel cell system of claim 1, wherein the predetermined voltages are equal to each other.

9. The fuel cell system of claim 1, wherein the predetermined voltages are different from each other.

* * * * *